United States Patent
Cole et al.

(10) Patent No.: US 8,632,675 B2
(45) Date of Patent: Jan. 21, 2014

(54) CO-PROCESSING OF DIESEL BIOFEED AND HEAVY OIL

(75) Inventors: Kathryn Y. Cole, Easton, PA (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1071 days.

(21) Appl. No.: 12/653,459

(22) Filed: Dec. 15, 2009

(65) Prior Publication Data

US 2010/0176026 A1     Jul. 15, 2010

Related U.S. Application Data

(60) Provisional application No. 61/203,627, filed on Dec. 24, 2008.

(51) Int. Cl.
*C10G 65/04* (2006.01)
*C10G 65/10* (2006.01)
*C10G 45/02* (2006.01)

(52) U.S. Cl.
USPC ............... 208/210; 208/59; 208/89; 208/211; 208/212; 208/213

(58) Field of Classification Search
None
See application file for complete search history.

(56) References Cited

U.S. PATENT DOCUMENTS

| 5,110,444 | A | 5/1992 | Haun et al. |
| 7,781,629 | B2 * | 8/2010 | Marchand et al. ............ 585/240 |
| 7,872,165 | B2 | 1/2011 | Bertoncini et al. |
| 2008/0156694 | A1 | 7/2008 | Chapus et al. |
| 2008/0161614 | A1 | 7/2008 | Bertoncini et al. |
| 2009/0166256 | A1 * | 7/2009 | Lewis et al. ..................... 208/89 |

FOREIGN PATENT DOCUMENTS

| EP | 1 640 437 A1 | 3/2006 |
| EP | 1 728 844 A1 | 12/2006 |
| EP | 1 741 767 A1 | 1/2007 |
| EP | 1 741 768 A1 | 1/2007 |
| EP | 1 693 432 B1 | 9/2009 |
| EP | 1 681 337 B1 | 12/2010 |
| FR | 2910485 | 6/2008 |
| GB | 1221275 | 10/1969 |
| WO | 2004/022674 A1 | 3/2004 |
| WO | 2007/125332 | 11/2007 |
| WO | 2009/085258 | 7/2009 |

* cited by examiner

*Primary Examiner* — Randy Boyer
(74) *Attorney, Agent, or Firm* — David M. Weisberg; Chad A. Guice

(57) ABSTRACT

Processes are provided for producing a diesel fuel product having a sulfur content of 10 ppm by weight or less from feed sources that include up to 50% by weight of a biocomponent feedstock. The biocomponent feedstock is co-processed with a heavy oil feed in a severe hydrotreating stage. The product from the severe hydrotreatment stage is fractionated to separate out a diesel boiling range fraction, which is then separately hydrotreated.

22 Claims, 1 Drawing Sheet

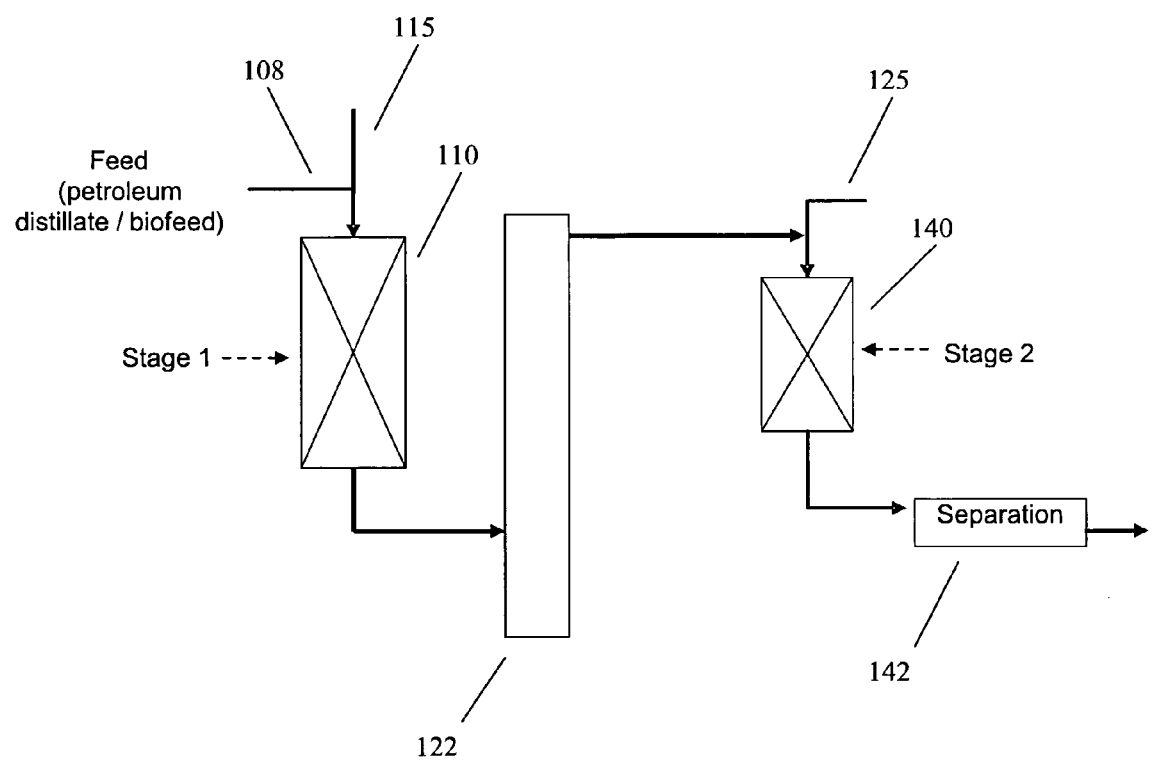

CO-PROCESSING OF DIESEL BIOFEED AND HEAVY OIL

This Application claims the benefit of U.S. Provisional Application 61/203,627 filed Dec. 24, 2008.

FIELD OF THE INVENTION

This invention provides a process for the manufacture of diesel range hydrocarbons that are low in sulfur and that include up to 50% by weight of a biocomponent feedstock. Particularly the invention relates to a multi-stage co-hydrotreating process for the manufacture of diesel range hydrocarbons from at least one biocomponent feedstock and at least one mineral hydrocarbon feedstock.

BACKGROUND OF THE INVENTION

Fuels based on biocomponent sources will become increasingly prevalent in the future. Already, various governments have instituted current and future requirements that motor fuel pools contain a minimum percentage of fuel derived from a biocomponent source, such as a plant, animal, fish, or algae based oil or fat.

Producing diesel fuel from biocomponent sources presents a variety of challenges. In particular, for diesel hydroprocessing units that operate at low pressures, the presence of the additional heteroatoms in a biocomponent based diesel feed may pose difficulties. Modifying and/or replacing low pressure units to allow for higher processing pressures would require expensive capital investment.

What is needed is a method to allow for hydroprocessing of diesel feeds that are at least partially based on a biocomponent source without requiring significant new construction at refineries. The method should allow for production of an ultra low sulfur diesel product.

EP1693432 describes co-processing of vegetable oils with various diesel type mineral refinery feeds. The method appears to include combining a vegetable and mineral oil, hydrotreating the combined oil, and stripping off gas phase products.

US Published Patent Application 2008/0161614 describes two stage co-processing of a feed including both vegetable/animal and mineral oil. The first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

SUMMARY OF THE INVENTION

In an embodiment, a method is provided for the production of a low sulfur diesel product. The method includes introducing a feedstock containing both a mineral portion and from about 0.1 wt % to about 50 wt % of a biocomponent portion. The mineral portion can have an initial boiling point of at least 550° F. Alternatively, the mineral portion can have a T5 boiling point of at least 600° F. The feedstock is then hydrotreated in a first reaction zone under first effective hydrotreating conditions including an LHSV of 0.3 to 2.0, a total pressure from about 800 to about 3000 psig, a treat gas rate of at least about 2000 scf/b of at least 80% hydrogen, and a temperature of from about 650-800° F., to produce a hydroprocessed feedstock. The hydroprocessed feedstock is fractionated to produce a diesel boiling range fraction and a portion boiling higher than the diesel range. The diesel boiling range fraction is then hydrotreated in a second reaction zone under second effective hydrotreating conditions including an LHSV of 0.5 to 1.5, a total pressure from about 250 to about 800 psig, and a temperature of from about 550-750° F. to produce a diesel boiling range product. Optionally, the hydroprocessed feedstock from the first reaction zone can be mixed with additional mineral feed prior to hydrotreatment in the second reaction zone. Optionally, the diesel boiling range product can be hydroisomerized to improve the cold flow properties of the diesel boiling range product.

In another embodiment, a method is provided for the production of a low sulfur diesel product. The method includes introducing a feedstock containing both a mineral portion and from about 0.1 wt % to about 50 wt % of a biocomponent portion. The mineral portion can have an initial boiling point of at least 550° F. Alternatively, the mineral portion can have a T5 boiling point of at least 600° F. The feedstock is then hydrocracked in a first reaction zone under first effective hydrocracking conditions to produce a hydroprocessed feedstock. The hydroprocessed feedstock is fractionated to produce a diesel boiling range fraction and a portion boiling higher than the diesel range. The diesel boiling range fraction is then hydrotreated in a second reaction zone under second effective hydrotreating conditions including an LHSV of 0.5 to 1.5, a total pressure from about 250 to about 800 psig, and a temperature of from about 550-750° F. to produce a diesel boiling range product. Optionally, the hydroprocessed feedstock from the first reaction zone can be mixed with additional mineral feed prior to hydrotreatment in the second reaction zone. Optionally, the diesel boiling range product can be hydroisomerized to improve the cold flow properties of the diesel boiling range product. Optionally, a hydrotreatment step can be added either prior to hydrocracking the feedstock, or after hydrocracking the feedstock and prior to fractionation.

BRIEF DESCRIPTION OF THE FIGURES

FIG. 1 schematically shows a reaction system for performing a process according to an embodiment of the invention.

DETAILED DESCRIPTION OF THE PREFERRED EMBODIMENTS

This invention provides processes for producing diesel fuels that include up to 50% by weight of a biocomponent feedstock and also have sulfur levels of 10 ppm or less. In an embodiment, the desired goals of the invention are achieved by co-processing a biocomponent feedstock with a mineral feedstock in a reaction system with multiple hydroprocessing stages. In the first hydroprocessing stage, a biocomponent feedstock is co-processed with a mineral feedstock in a high severity hydrotreatment reactor. The biocompoment feedstock can be any vegetable (including plant), animal, fish, or algae based fat or oil that would typically be considered for use as a source for biodiesel. The mineral feedstock will have a minimum initial boiling point of at least 650° F. Alternatively, the mineral feedstock can have a T5 boiling point of at least 665° F. An example of a hydrotreatment reactor for treatment of a feedstock with an initial boiling point of at least 650° F. is a hydrotreatment reactor for processing the feed to a fluid catalytic cracking unit, sometimes referred to as a catalytic feed hydrotreatment reactor.

A high severity hydrotreatment reactor is well-suited to handle many of the difficulties associated with processing a biocomponent feedstock. For example, biocomponent diesel range feeds typically contain a large amount of oxygen. A large amount of hydrogen is needed to effectively remove the oxygen from the feed. The pressure and hydrogen flow rates in a high severity hydrotreatment reactor can readily handle this increased hydrogen requirement. Removing oxygen from a biocomponent feed is also an exothermic reaction, which has the potential to overwhelm the temperature control systems of a standard hydrotreatment reactor. However, the quench system for a high severity hydrotreatment reactor should allow for effective temperature control during processing of a biocomponent feed. Finally, since the biocomponent feed is a diesel range feed, the fact that the high severity hydrotreatment reactor will saturate any olefins is an added benefit.

The output from the high severity hydrotreatment reactor is then sent to a fractionator. Due to the high boiling point of the mineral feed, a large portion of the effluent from the high severity hydrotreatment reactor is not intended for use as a diesel fuel. The fractionator is used to separate the diesel boiling range fraction of the effluent from the remaining output. This diesel boiling range fraction is then sent to a second hydrotreatment stage operating at lower severity. The second stage is used to produce a diesel fuel product. Optionally, the diesel fuel product may be further processed by dewaxing the diesel fuel product, in order to improve the cold flow properties of the fuel.

In the discussion below, a biocomponent feedstock refers to a hydrocarbon feedstock derived from a biological raw material component, such as vegetable fats/oils or animal fats/oils (including fish and algae fats/oils). Note that for the purposes of this document, vegetable fats/oils refer generally to any plant based material, and include fat/oils derived from a source such as plants from the genus Jatropha. The vegetable oils and animal fats that can be used in the present invention include any of those which comprise primarily triglycerides and free fatty acids (FFA). The triglycerides and FFAs contain aliphatic hydrocarbon chains in their structure having 8-24 carbons. Other types of feed that are derived from biological raw material components include fatty acid esters, such as fatty acid methyl esters. Examples of biocomponent feedstocks include but are not limited to rapeseed (canola) oil, corn oil, soy oils, castor oil, and palm oil.

The mineral hydrocarbon feedstock that is co-processed with the biocomponent feedstock in the higher severity stage is preferably a feedstock with an initial boiling point of at least about 550° F., or at least about 600° F., or at least about 650° F. Alternatively, the feedstock can be characterized by the boiling point required to boil a specified percentage of the feed. For example, the temperature required to boil at least 5 wt % of a feed is referred to as a "T5" boiling point. Preferably, the mineral hydrocarbon feedstock has a T5 boiling point of at least about 600° F., or at least about 650° F., or at least about 665° F. Preferably, the mineral hydrocarbon feed has a T95 boiling point of about 1100° F. or less, or about 1050° F. or less. An example of this type of feed is a feed for a fluid catalytic cracking unit. Such a feed typically is hydro-processed in a high severity hydrotreatment stage prior to introduction into the fluid catalytic cracking stage.

In a high severity hydrotreatment stage, some conversion of higher boiling point components to lower boiling points will occur. As a result, a high severity hydrotreatment stage will typically make some diesel range compounds. During fractionation, these diesel range compounds will be separated out and mix with the biocomponent based diesel product.

In various embodiments of the invention, the feed to the higher severity hydrotreatment stage can include both feeds from biocomponent sources, such as vegetable sources or animal sources, and feeds from mineral sources. The feed can include varying amounts of feedstreams based on biocomponent sources, such as vegetable oils, animal fats, fish oils, algae oils, etc. The feed can include at least 0.1 wt % of feed based on a biocomponent source, or at least 0.5 wt %, or at least 1 wt %, or at least 3 wt %, or at least 10 wt %, or at least 15 wt %. In such embodiments, the feed can include 60 wt % or less of biocomponent, or 50 wt % or less, or 40 wt % or less, or 30 wt % or less. In other embodiments, the amount of co-processing can be small, with a feed that includes at least 0.5 wt % of feedstock based on a biocomponent source, or at least 1 wt %, or at least 2.5 wt %, or at least 5 wt %. In such an embodiment, the feed can include 20 wt % or less of biocomponent based feedstock, or 15 wt % or less, or 10 wt % or less, or 5 wt % or less.

Biocomponent based diesel boiling range feedstreams typically have low nitrogen and sulfur content. For example, a biocomponent based feedstream can contain up to about 300 wppm nitrogen. Instead of nitrogen and/or sulfur, the primary heteroatom component in biocomponent based feeds is oxygen. Suitable biocomponent diesel boiling range feedstreams can include up to about 10-12 wt % oxygen. Mineral feedstreams for blending with a biocomponent feedstream can have a nitrogen content from about 50 to about 6000 wppm nitrogen, preferably about 50 to about 2000 wppm nitrogen, and more preferably about 75 to about 1000 wppm nitrogen. In an embodiment, feedstreams suitable for use herein have a sulfur content from about 100 to about 40,000 wppm sulfur, preferably about 200 to about 30,000 wppm, and more preferably about 350 to about 25,000 wppm.

The combined feedstock is introduced into a first hydrotreatment reactor that includes one or more catalyst beds that contain a hydrotreatment catalyst. The combined feedstock is exposed to each catalyst bed while being exposed to hydrodesulfurization and hydrodeoxygenation conditions. Such conditions will also result in olefin saturation of any olefins present in the biocomponent feedstock. In this first hydrotreatment reactor, higher severity conditions are employed in order to appropriately treat the heavier mineral feed that is mixed with the biocomponent feed.

The catalyst in the first hydrotreatment reactor can be a conventional hydrotreating catalyst, such as a catalyst composed of a Group VIB metal and/or a Group VIII metal on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania.

The reaction conditions in the first hydrotreatment reactor can be conditions suitable for reducing the sulfur content of the feedstream while also deoxygenating the feedstream and saturating olefins as the feedstream is exposed to the catalyst beds in the reactor. In a preferred embodiment, the reaction conditions of the first hydrotreatment reactor are selected to perform a thorough hydrodeoxygenation while reducing the sulfur of the feedstock to a value between about 800 wppm and 1500 wppm S. Alternatively, the reaction conditions in the first hydrotreatment reactor can be selected to reduce the sulfur to between about 100 wppm and 200 wppm S. In still other embodiments, the sulfur can be reduced to about 1500 wppm or less, or about 1000 wppm or less, or about 500 wppm or less, or about 200 wppm or less. The sulfur can be reduced to about 100 wppm or more, or about 200 wppm or more, or about 500 wppm or more.

The reaction conditions can include an LHSV of 0.3 to 2.0, a total pressure from about 800 to about 3000 psig, a treat gas rate of at least about 2000 scf/b of at least 80% hydrogen (remainder inert gas), and a temperature of from about 650-

800° F. Preferably, the reaction conditions include an LHSV of from about 0.9 to about 1.1, a total pressure from about 1400 to about 2000 psig, a hydrogen treat gas rate of about 2100-2500 scf/b of at least 80% hydrogen (remainder inert gas), and a temperature of from about 700-750° F. Alternatively, the hydrogen treat gas rate can be from about 2000 scf/b to about 3000 scf/b.

Due to the high severity conditions, the first hydrotreatment reactor will typically include a quench mechanism, where a fluid is introduced into the reaction zone to control reaction temperature. This quench mechanism assists in maintaining a desired temperature in spite of the heat release due to the exothermic nature of hydrodeoxygenation of the biocomponent portion of the feedstock. The quench fluid can be a make-up hydrogen gas stream, an inert gas stream such as nitrogen, a liquid stream such as a liquid product stream of recycled product from the second hydrotreatment reactor, an additional flow of a mineral feedstock, or a combination of two or more of the above types of quench fluids.

In yet another embodiment, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent to remove metals, filtering the biocomponent portion to remove sediment, or other processes. Alternatively, an optional metals removal pretreatment can take place in the first reactor after mixing of the biocomponent and mineral hydrocarbon feeds, by exposing the combined feedstock to a demetallization catalyst under demetallization conditions prior to hydrodesulfurization and/or hydrodeoxygenation.

After hydrotreatment in the higher severity stage, the hydrotreated feed is passed to a fractionator to separate diesel range compounds from heavier compounds. This produces a diesel boiling range fraction containing the diesel range compounds. The fractionation also results in removal of gas phase products, such as $H_2S$, CO, $CO_2$, or $NH_3$. After fractionation, the diesel boiling range fraction can optionally be mixed with a separate diesel boiling range feedstream prior to the less severe hydrotreatment stage. Diesel boiling range feedstreams suitable for use in the present invention boil within the range of about 215° F. to about 800° F. Preferably, the diesel boiling range feedstream has an initial boiling point of at least 250° F., or at least 300° F., or at least 350° F., or at least 400° F., or at least 451° F. Preferably, the diesel boiling range feedstream has a final boiling point of 800° F. or less, or 775° F. or less, or 750° F. or less. In an embodiment, the diesel boiling range feedstream has a boiling range of from 451° F. to about 800° F. In another embodiment, the diesel boiling range feedstream also includes kerosene range compounds to provide a feedstream with a boiling range of from about 250° F. to about 800° F. The separate diesel boiling range feedstream can be mineral based, biocomponent based, or a mixture of mineral and biocomponent based.

After passing through the first hydrotreatment reactor and the fractionator, the diesel boiling range fraction (and any additional diesel boiling range feedstream) are passed into a second hydrotreatment reactor. The second hydrotreatment reactor includes one or more catalyst beds containing a hydrotreating catalyst. The diesel range compounds contact the hydrotreating catalyst in the second hydrotreatment reactor under hydrodesulfurization conditions. The output stream from the second hydrotreatment reactor is a diesel fuel with an improved cetane number and a sulfur content of 10 ppm by weight or less.

The catalyst in the second hydrotreatment reactor can be a catalyst composed of a Group VIB metal and/or a Group VIII metal, optionally on a support. Suitable metals include nickel, molybdenum, tungsten, or combinations thereof. Suitable supports include silica, silica-alumina, alumina, and titania.

The reaction conditions in the second hydrotreatment reactor can be conditions suitable for reducing the sulfur content of the feedstream to about 10 ppm by weight or less as the feedstream is exposed to the catalyst beds in the reaction zone. The reaction conditions can include an LHSV of 0.5 to 1.5, a total pressure from about 250 to about 800 psig, and a temperature of from about 550-750° F. Preferably, the reaction conditions include an LHSV of from about 0.9 to about 1.1, a total pressure from about 350 to about 600 psig, a hydrogen treat gas rate of about 950-1050 scf/b of at least 95% hydrogen (remainder inert gas), and a temperature of from about 625-675° F.

Preferably, the reaction conditions in the second hydrotreatment reactor are less severe relative to the conditions in the first hydrotreatment reactor. For example, the pressure in the second hydrotreatment reactor can be about 250 psig less than the pressure in the first hydrotreatment reactor, or about 300 psig less, or about 600 psig less, or about 900 psig less. In another embodiment, the LHSV in the second hydrotreatment reactor can be at least about 0.2 higher than the LHSV in the first hydrotreatment reactor, or at least about 0.5 higher. In still another embodiment, the start of run temperature in the second hydrotreatment reactor can be from about 15 to about 30° C. less than the start of run temperature in the first hydrotreatment reactor.

The output from the second hydrotreatment reactor can be optionally passed to a separation zone for separation of a vapor phase stream and a liquid phase product stream. After such a separation, the liquid phase product stream can optionally be passed to a hydroisomerization stage. The hydroisomerization stage can be used to further improve the cold-flow properties of the liquid phase product stream. In another optional embodiment, the hydrotreated feed can be blended with a feed containing fatty acid methyl esters, to further increase the amount of biocomponent.

In the optional hydroisomerization stage, the liquid phase product stream from the second reactor is exposed to one or more reaction zones, optionally present in a separate reactor, that are operated at hydroisomerization conditions in the presence of hydroisomerization catalyst. Generally, catalytic dewaxing can be accomplished by selective hydrocracking or by hydroisomerizing long chain molecules within a feed such as a diesel range feed. Dewaxing catalysts are suitably molecular sieves such as crystalline aluminosilicates (zeolites) or silico-aluminophosphates (SAPOs). These catalysts may also carry a metal hydrogenation component, preferably Group VIII metals, especially Group VIII noble metals. Dewaxing conditions include temperatures of 280-380° C., pressures of 300-3000 psig, LHSV of 0.1-5.0 $h^{-1}$ and treat gas rates of from 500-5000 scf/bbl.

In various embodiments, the molecular sieve used for catalytic dewaxing is ZSM-48. ZSM-48 is a 10-member ring 1-D molecular sieve. ZSM-48 performs dewaxing primarily by isomerizing molecules within the feed. Typical silica to alumina ratios for the ZSM-48 are 250 to 1 or less, or 200 to 1 or less. Preferably, the silica to alumina ratio of the ZSM-48 is less than 110 to 1. To form a catalyst, the ZSM-48 can be composited with a binder. Suitable binders include silica, alumina, silica-alumina, titania, zirconia, or a mixture thereof. Other suitable binders will be apparent to those of skill in the art.

Another alternative for the above process scheme is to use a hydrocracker to further treat the mixed biocomponent and mineral feed. The hydrocracker can be in place of the first hydrotreatment reactor, or a combination of hydrotreatment and hydrocracking can be used in place of the first hydrotreatment reactor. Examples of hydrocracking catalysts include nickel, nickel-cobalt-molybdenum, cobalt-molybdenum and nickel-tungsten and/or nickel-molybdenum, the latter two which are preferred. Non-limiting examples of noble metal catalysts include those based on platinum and/or palladium. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports, especially the large pore faujasites such as USY can also be used. Suitable hydrocracking conditions can include temperatures of from about 200° C. to about 450° C., hydrogen pressures of from about 5 barg to about 300 barg, liquid hourly space velocities of from about 0.05 h$^{-1}$ to about 10 h$^{-1}$ and hydrogen treat gas rates of from about 40 m$^3$/m$^3$ to about 1800 m$^3$/m$^3$ (about 250 SCF/B to about 11,400 SCF/B). If both a hydrocracker and a hydrotreater are used in place of the first hydrotreatment reactor, the conditions in the hydrotreater can be similar to any of the hydrotreatment conditions described previously.

A reaction system suitable for carrying out the above processes is shown schematically in FIG. 1. In FIG. 1, a combined mineral hydrocarbon and biocomponent feedstock 108 is introduced into a first (severe) hydrotreatment reactor 110. A hydrogen treat gas stream 115 is also introduced into hydrotreatment reactor 110. The combined feedstock is exposed to hydrotreating conditions in first hydrotreatment reactor 110 in the presence of one or more catalyst beds that contain hydrotreating catalyst. Preferably, this reduces the sulfur content in the distillate cut of the treated feedstock to about 400 wppm S or less, or about 200 wppm S or less, or about 100 wppm S or less. The treated feedstock flows into a fractionator 122. Fractionator 122 separates out a diesel boiling range fraction in the feed from the heavier products. Fractionator 122 also separates out any gaseous contaminants, such as $H_2S$, CO, $CO_2$, or $NH_3$, that are present after the first hydrotreatment stage.

After passing through first hydrotreatment reactor 110 and optionally separator 122, the diesel boiling range fraction enters second hydrotreatment reactor 140, along with a second hydrogen treat gas stream 125. Optionally, a second mineral feed can also be mixed with the diesel boiling range fraction. This reduces the sulfur content of the treated combined feedstocks to about 10 ppm by weight or less. Optionally, the treated feedstock can then pass through a separator 142 for separating gas and liquid products. In such an embodiment, hydrogen gas from separator 142 can be used as a recycled hydrogen gas stream (not shown) for the second hydrotreatment reactor.

The product from the second reactor can undergo a variety of additional process steps. Optionally, the product from the second reactor can be separated into a gas phase product and a liquid phase product using a separator. The gas phase product from the separator can be recycled for further use in the second hydrotreating reactor. After separation, the liquid product from the second hydrotreating reactor can be exposed to a hydroisomerization catalyst under hydroisomerization conditions. Optionally, before such a hydroisomerization step, the liquid stream can be passed through a liquid treatment step, such as by exposing the liquid to filtration, a caustic solution wash, or a treatment with chemical agents to remove sulfur and trace contaminants. Alternatively, the liquid stream can be passed through a sulfur adsorption step, such as by exposing the liquid stream to metallic Ni, ZnO, or another adsorber of sulfur species.

What is claimed is:

1. A method for producing a low sulfur diesel product, comprising:
    introducing a feedstock containing both a mineral portion and from about 0.1 wt % to about 50 wt % of a biocomponent portion, the mineral portion having an initial boiling point of at least 550° F.;
    hydrotreating the feedstock in a first reaction zone under first effective hydrotreating conditions including an LHSV of 0.3 to 2.0, a total pressure from about 1400 to about 3000 psig, a treat gas rate of at least about 2000 scf/b of at least 80% hydrogen, and a temperature of from about 650-800° F., to produce a hydroprocessed feedstock having a sulfur content of about 100 wppm S to about 1500 wppm S;
    fractionating the hydroprocessed feedstock to produce a diesel boiling range fraction and a portion boiling higher than the diesel range;
    hydrotreating the diesel boiling range fraction in a second reaction zone under second effective hydrotreating conditions including an LHSV of 0.5 to 1.5, a total pressure from about 250 to about 800 psig, and a temperature of from about 550-750° F. to produce a diesel boiling range product.

2. The method of claim 1, wherein the first reaction zone comprises a catalytic feed hydrotreatment reactor.

3. The method of claim 2, further comprising:
    hydrotreating the feedstock under effective hydrotreatment conditions prior to hydrocracking;
    hydrotreating the hydroprocessed feedstock prior fractionation; or
    both.

4. The method of claim 1, wherein:
    the first effective hydrotreating conditions include an LHSV of from about 0.9 to about 1.1, a hydrogen partial pressure from about 1400 to about 2000 psig, a hydrogen treat gas rate of about 2100-2500 scf/b of at least 80% hydrogen, and a temperature of from about 700-750° F.;
    the second effective hydrotreating conditions include an LHSV of from about 0.9 to about 1.1, a total pressure from about 350 to about 600 psig, a hydrogen treat gas rate of about 950-1050 scf/b of at least 95% hydrogen (remainder inert gas), and a temperature of from about 625-675° F.; or
    both.

5. The method of claim 1, wherein the biocomponent feedstock comprises a plant oil or fat, an animal oil or fat, a fish oil or fat, or an algae oil or fat.

6. The method of claim 5, wherein the biocomponent feedstock comprises palm oil.

7. The method of claim 1, wherein the mineral hydrocarbon feedstock has T95 boiling point of 1000° F. or less.

8. The method of claim 1, further comprising mixing the diesel boiling range fraction with an additional mineral feed prior to hydrotreatment in the second reaction zone.

9. The method of claim 1, further comprising hydroisomerizing the diesel boiling range product.

10. The method of claim 5, wherein at least 95 wt % of the oxygen is removed from the feedstock.

11. The method of claim 10, wherein at least 98 wt % of the oxygen is removed from the feedstock.

12. The method of claim 1, wherein the oxygen content of the hydroprocessed feedstock is 0.1 wt % or less.

13. The method of claim 1, wherein the first effective hydrotreating conditions include a total pressure from about 2000 to about 3000 psig.

14. A method for producing a low sulfur diesel product, comprising:
introducing a feedstock containing both a mineral portion and from about 0.1 wt % to about 50 wt % of a biocomponent portion, the mineral portion having a T5 boiling point of at least 600° F.;
hydrotreating the feedstock in a first reaction zone under first effective hydrotreating conditions including an LHSV of 0.3 to 2.0, a total pressure from about 800 to about 3000 psig, a treat gas rate of at least about 2000 scf/b of at least 80% hydrogen, and a temperature of from about 650-800° F., to produce a hydroprocessed feedstock having a sulfur content of about 100 wppm S to about 1500 wppm S;
fractionating the hydroprocessed feedstock to produce a diesel boiling range fraction and a portion boiling higher than the diesel range;
hydrotreating the diesel boiling range fraction in a second reaction zone under second effective hydrotreating conditions including an LHSV of 0.5 to 1.5, a total pressure from about 250 to about 800 psig, and a temperature of from about 550-750° F. to produce a diesel boiling range product, the total pressure of the second effective hydrotreating conditions being at least 250 psig less than the total pressure of the first effective hydrotreating conditions.

15. The method of claim 14, further comprising:
hydrotreating the feedstock under effective hydrotreatment conditions prior to hydrocracking;
hydrotreating the hydroprocessed feedstock prior to fractionation; or
both.

16. The method of claim 14, wherein:
the first effective hydrotreating conditions include an LHSV of from about 0.9 to about 1.1, a hydrogen partial pressure from about 1400 to about 2000 psig, a hydrogen treat gas rate of about 2100-2500 scf/b of at least 80% hydrogen, and a temperature of from about 700-750° F.;
the second effective hydrotreating conditions include an LHSV of from about 0.9 to about 1.1, a total pressure from about 350 to about 600 psig, a hydrogen treat gas rate of about 950-1050 scf/b of at least 95% hydrogen (remainder inert gas), and a temperature of from about 625-675° F.; or
both.

17. The method of claim 14, wherein the mineral hydrocarbon feedstock has T95 boiling point of 1000° F. or less.

18. The method of claim 14, further comprising hydroisomerizing the diesel boiling range product.

19. The method of claim 14, wherein the first effective hydrotreating conditions include a total pressure from about 2000 to about 3000 psig.

20. A method for producing a low sulfur diesel product, comprising:
introducing a feedstock containing both a mineral portion and from about 0.1 wt % to about 50 wt % of a biocomponent portion, the mineral portion having a T5 boiling point of at least 600° F.;
hydrocracking the feedstock in a first reaction zone under first effective hydrocracking conditions to produce a hydroprocessed feedstock having a sulfur content of about 100 wppm S to about 1500 wppm S;
fractionating the hydroprocessed feedstock to produce a diesel boiling range fraction and a portion boiling higher than the diesel range;
hydrotreating the diesel boiling range fraction in the second reaction zone under second effective hydrotreating conditions including an LHSV of 0.5 to 1.5, a total pressure from about 250 to about 800 psig, and a temperature of from about 550-750° F. to produce a diesel boiling range product.

21. The method of claim 1, wherein the hydroprocessed feedstock has a sulfur content of about 100 wppm S to about 200 wppm S.

22. The method of claim 14, wherein the hydroprocessed feedstock has a sulfur content of about 800 wppm S to about 1500 wppm S.

* * * * *